Figure 1:
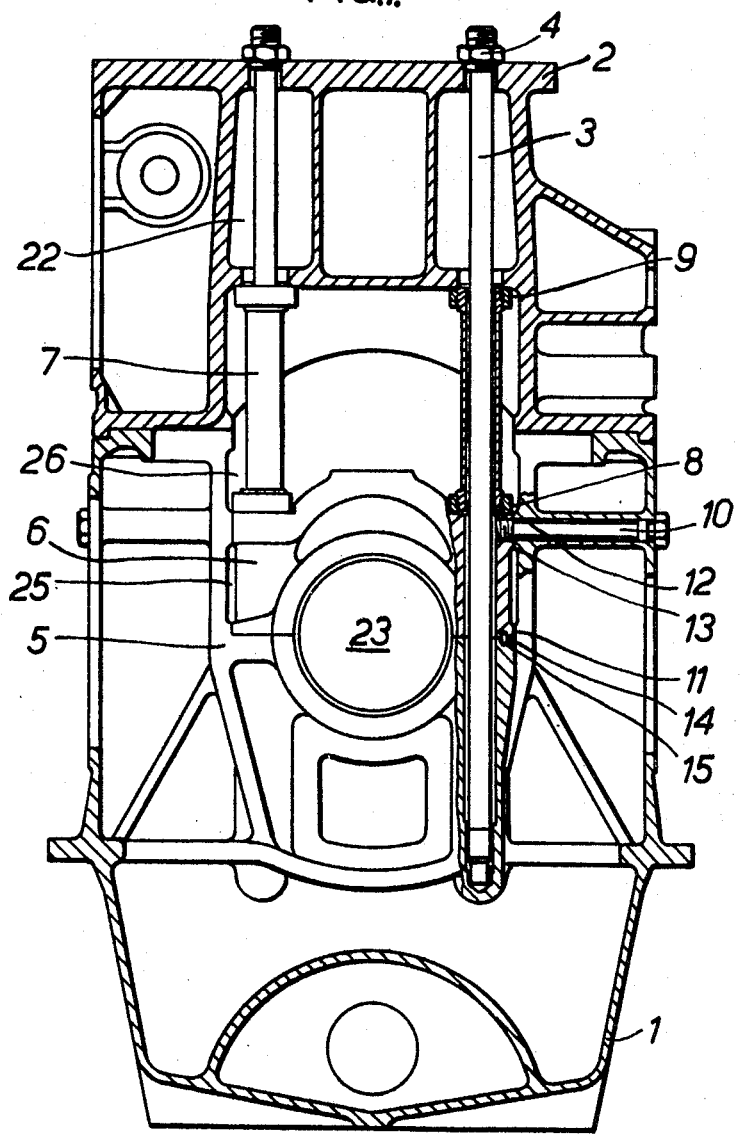

United States Patent

[11] 3,592,516

| [72] | Inventor | Hans Standhardt<br>Magdeburg, Germany |
| [21] | Appl. No. | 813,889 |
| [22] | Filed | Apr. 7, 1969 |
| [45] | Patented | July 13, 1971 |
| [73] | Assignee | Veb Schwermaschinenbau "Karl Liebknecht" Magdebrug<br>Magdeburg, Germany |

[54] RETAINING DEVICE FOR CRANKSHAFT BEARINGS OF INTERNAL COMBUSTION ENGINES
7 Claims, 2 Drawing Figs.

| [52] | U.S. Cl. | 308/23, 123/193 |
| [51] | Int. Cl. | F16c 3/06 |
| [50] | Field of Search | 308/23; 123/195, 56, 193; 74/586 |

[56] References Cited
UNITED STATES PATENTS

| 1,514,066 | 11/1924 | Page | 123/195 |
| 2,019,657 | 11/1935 | Church | 123/195 H |
| 2,752,896 | 7/1956 | Emele | 123/195 |
| 3,166,992 | 1/1965 | Francis | 308/23 |
| 223,697 | 1/1880 | Blake | 74/586 |
| 1,554,162 | 9/1925 | Spina | 308/23 |

*Primary Examiner*—William F. O'Dea
*Assistant Examiner*—Wesley S. Ratliff, Jr.
*Attorney*—Nolte and Nolte ABSTRACT: A shaft-bearing structure, mainly for the crankshaft of an internal combustion engine, where the engine has a cylinder block and a base plate. The bearing structure comprises an upwardly facing bearing block, integral with the base plate, and a downwardly facing bearing cover, downwardly spaced from an end of the cylinder block by an intermediate space. Tension-resistant connecting rods extend through the cylinder block, the intermediate space, and the bearing cover, into the bearing block to aid in uniting the cylinder block with the base plate. Compression-resistant sleeves coaxially surround the connecting rods, in the intermediate space, to releasably press the bearing cover against the bearing block, at points close to the axis, as defined by said rods, while allowing the bearing cover and sleeves to be upwardly removed from the bearing blocks, through the intermediate space, to facilitate inspection and repair of the shaft-bearing structure.

RETAINING DEVICE FOR CRANKSHAFT BEARINGS OF INTERNAL COMBUSTION ENGINES

The present invention relates generally to retaining of bearings in internal combustion engines. More particularly, the present invention relates to a crankshaft bearing retainer in I.C. engines having a baseplate structure supporting a cylinder block and being connected thereto by elongated connecting rods, whereby the bearing block covers are held in position by pressure elements on the sleeves.

In order to keep at a low value the bending moments occurring in connecting rods which anchor the cylinder block to the baseplate, it has been suggested in prior art solutions to arrange the connecting rods as close to the crankshaft as possible. In this design the bearing covers of the bearing block are held in position by pressure bolts which abut against the bearing cover at one end and against the cylinder block at the opposite end.

However, in I.C. engines of high power, considerable strain resulting from extreme combustion pressures is acting against the connecting rods between the cylinder block and the baseplate and this strain counteracts the pressure forces exerted by the rigid pressure bolts on the bearing covers.

It has been also known how to keep constant pressure applied upon the bearing covers and thus prevent their lifting by making the pressure bolts between the bearing cover and the cylinder block in the form of necked-down screws the length of which equals approximately twice the diameter of the borings in the bearing of the crankshaft. Nonetheless, even in this case there result excess bending moments in the baseplate due to a relatively large distance between the crankshaft and the connecting rods and, moreover, an unfavorable distribution of all stresses resulting from the action of the driving mechanism.

The same disadvantages occur in another known embodiment of the crankshaft bearing retainer in which the pressure-exerting elements are made as resilient means in the form of a tension spring of square section or in the form of a plate spring set. A further disadvantage of the latter embodiment resides in a relatively complicated structure of the retaining elements. In prior art retainers for crankshaft bearings with pressure elements for retaining the bearing cover, it has been also necessary to assemble the entire supporting system of the I.C. engine prior to the boring of the main bearing hole in order that the hole be formed under the same strain condition as that in the finally assembled engine, thus insuring the concentricity of the bore.

The primary object of the present invention is to eliminate the aforementioned disadvantages of prior art retaining devices and to increase the production and maintenance economy especially in internal combustion engines of great power.

In particular, the object of the present invention is to provide a crankshaft bearing retaining device for I.C. engines which is simple in design, can be easily installed, inspected and dismounted.

Another object of the present invention is to provide a retaining device which reduces to minimum the bending stress caused by the forces transmitted from the driving parts.

A further object of the present invention is to enable machining of the bearing hole prior to the assembly of the engine frame while guaranteeing the concentricity of the bearing hole after the final assembly.

According to the present invention the above objects are attained by providing that the bearing cover is forced against the bearing block by adjustable pressing elements, such as screw nuts, for example, arranged on threaded ends of resilient compression sleeves. The compression sleeves are disposed between the cylinder block and the bearing block, and the connecting rod anchoring the cylinder block to the baseplate passes therethrough. The cylinder block is provided with elongated chambers or channels into which respective sleeves can be raised through passages for the connecting rods.

Another characteristic feature of the present invention resides in that the pressing elements may be equipped with conventional hydraulic pressure members enabling an adjustable pretension of the pressure elements.

Still another feature of the invention, especially in I.C. engines having upwards extending baseplates, is in successively arranged mating surface portions or fitting seats of vertical walls of the bearing covers and the baseplate, and in laterally projecting bolts adjustably securing the position of the bearing covers.

An advantage of the present invention results from the compact structure of the retaining means for crankshaft bearings by combining the same with connecting rods, and from the fact that the connecting rod can be arranged in close proximity to the crankshaft. Since the pressure elements for bearing covers are disposed coaxially with the connecting rods for the cylinder block, the crankshaft bearing components are in position to withstand substantially increased stresses transmitted from the driving mechanism.

A further advantage of the present invention relates to the machining of the main bearing hole in the bearing block and cover. The bearing cover is simply attached to the baseplate structure by means of mounting bolts and the bearing hole can be bored without setting up the cylinder block, whereby the same pre-tension is attained which will occur after the final assembly of the entire engine.

Figure 2:
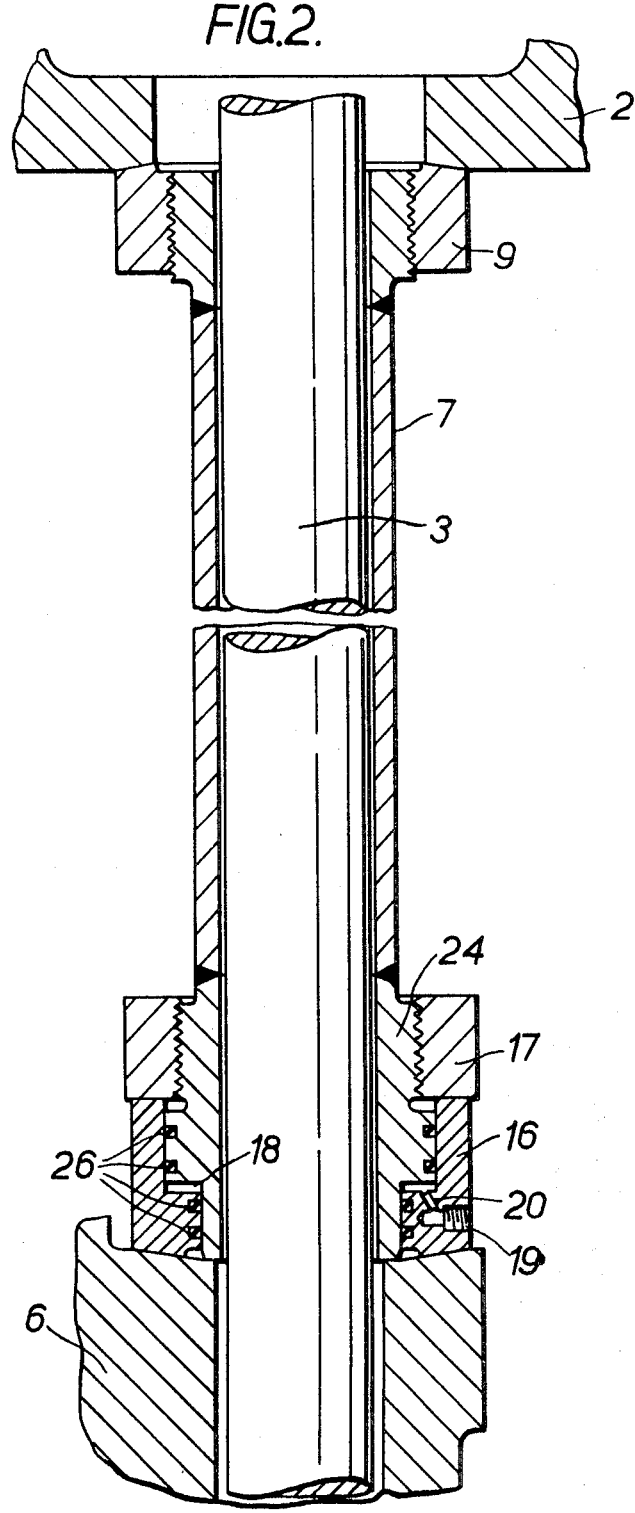

The invention will now be explained in greater detail by way of an example with reference to accompanying drawings wherein:

FIG. 1 is a front view, partly in section, of a crankshaft bearing retainer of this invention; and FIG. 2 is a detailed sectional view of another embodiment of the pressure element of FIG. 1.

As shown in FIG. 1, cylinder block 2 is mounted on baseplate 1 and fastened thereto by means of connecting rods 3 and nuts 4. Bearing covers 6 seat on a one-piece bearing block 5 which is integral with elevated portions of baseplate 1. The bearing covers 6 are fastened in the vertical direction by resilient compression sleeves 7 and pressure nuts 8 and 9 and, in the horizontal direction, by bolts 10. The compression sleeves 7 are supported at one end thereof by pressure adjustment nuts 8 abutting on bearing cover 6 and, at the other end thereof, by pressure adjustment nuts 9 pressing on cylinder block 2. In the area between the bearing cover and the cylinder block, respective connecting rods 3 are surrounded by the compression sleeves 7. To adjust transversely the bearing covers 6 with respect to the longitudinal axis of crankshaft 23, vertical surface portions of bearing covers and of the bearing block are provided with recesses 25 and 26 which determine vertical lower-upper and intermediate fitting or seat surface portions 11, 12 and 13 mating with corresponding seat surfaces in bearing block 5. Besides the horizontal fitting surface between bearing covers and the bearing block, the bearing block is provided with reamed bores for receiving guiding pins 15.

With reference to FIG. 2 showing a modification of the compression sleeve of FIG. 1, the compression sleeve 7 has at its lower end portion a stepped shoulder 24. The upper step of the shoulder is threaded for engaging pressure nut 17, whereas the periphery of the projecting lower step and of the recessed end of the sleeve mate closely with the stepped inner wall of pressure socket 16. Between the lower step of shoulder 24 and the top surface of the inner step of socket 16, a pressure space 18 is provided, this space being connected through channel 20 with a pressure liquid inlet 19 in the pressure socket 16. Between mating peripheral surfaces of pressure socket 16 and the stepped sleeve portion above and below the pressure space 18, there are arranged a number of seal rings 21 for sealing the pressure liquid, as will be explained below.

The application of the invention is as follows:

After the placing of the crankshaft in bearing block 5 and setting the bearing covers 6 in their positions, bolts 10 are inserted into aligned holes in baseplate 1 and bearing covers 6 and screwed in. The pressure nuts 8 and 9 (or pressure socket 16 and nut 17) are affixed to respective ends of sleeve 7 and the sleeves 7 are positioned on bearing covers 6. The cylinder block 2 is set up and tightened to baseplate 1 by means of connecting rods 3 and nuts 4. Subsequently, the bearing covers 6 are pre-tensioned to a desired value by pressure nuts 8 and 9 and by compression sleeves 7. In the modification as shown in FIG. 2, the pre-tensioning is accomplished by a pressure liquid which is introduced into pressure space 18 through inlet boring 19 and connecting channel 20. The liquid axially displaces the compression sleeve with respect to pressure socket 16 resting on bearing cover 6, so that nut 17 may be further tightened against the pressure socket. The pre-tensioning may be arbitrarily adjusted by varying the pressure of the liquid. The pre-tension which remains between the baseplate 1 and the cylinder block 2 is reduced about the value of the previous pre-tension produced by connecting rods 3 between bearing block 5 and bearing cover 6.

It is often required to exchange seats of main bearings in assembled condition of the internal combustion engine. For this purpose, compression sleeves 7 are relieved from tension by disengaging pressure nuts 8 and 9 (or nut 17 by the aid of pressure fluid introduced into pressure space 18). The compression sleeves 7 are then displaced upwards into channels or elongated chambers 22 provided in the cylinder block 2 around the connecting rods, whereby nuts 9 will lie upon nuts 8 and 17. After the removal of bolts 10 the bearing covers 6 can be lifted as high as to enable the bearing seat sections to be taken out and to replace the same with new ones. The withdrawal of bearing covers 6 can thus be accomplished without damaging seat surfaces 11, 12 and 13, since the bearing covers are displaced to such a height only at which the lower seat surface portion 11 of the bearing cover comes to the point below the upper surface portion 12 of the bearing block 5. Up to this point it is possible to lift up safely the bearing covers because of the increased clearance of recesses 25 and 26 which insure that the trueing of respective mating seat surfaces remains unaffected. Through the recesses 25 and 26, the bearing covers can be removed in the axial direction of the crankshaft from the assembled bearing and cylinder blocks and replaced again without rubbing the vertical seat surface portions.

In the application of the retaining device of the present invention in internal combustion engines having the crankshaft and the matching faces of the housing and of the bearing block arranged on a single level, the upper and intermediate seat surface portions 12 and 13, as well as the lateral bolt 10 may be omitted.

The retaining device of this invention is applicable to internal combustion engines having a plurality of series arranged cylinders as well as for the V-arrangement of the cylinders.

The compression sleeves can be made of any suitable metal material, such as of steel, for example.

What I claim is:

1. Shaft-bearing structure for an engine cylinder block and baseplate unit held together by tension-resistant anchor means, said bearing structure comprising: an upwardly facing bearing block, integral with the baseplate; a downwardly facing bearing cover, concentric with and overlying the bearing block, having lateral parts in contact with lateral parts of the bearing block, and downwardly spaced from an end of the cylinder block by an intermediate space; a pair of connecting rods forming part of said anchor means, said rods being disposed on both sides of, and close to, the axis of the bearing block and bearing cover and extending from above through the cylinder block, intermediate space, and lateral parts of the bearing cover into the bearing block; a pair of compression-resistant sleeves, each coaxially surrounding one of the connecting rods, in said intermediate space; and pressure elements releasably secured to each sleeve to normally press the bearing cover, by the sleeve and the end of the cylinder block, against the bearing block, at points close to said axis, which points are defined by said rods, while allowing the bearing cover and sleeves to be upwardly removed through said intermediate space for inspection and repair of the shaft-bearing structure.

2. Shaft-bearing structure according to claim 1, wherein each of said pressure elements is a nut in threaded engagement with a respective end of a respective one of said sleeves.

3. The device according to claim 1, wherein said pressure elements include liquid actuated hydraulic means.

4. The device according to claim 1 for engines having upwards extending baseplate inner walls complementary to lateral walls of said bearing covers, further comprising recessed portions in said baseplate inner walls and in said lateral walls of the bearing covers for defining successively arranged seat surface portions and enabling the removal of said bearing covers.

5. The device according to claim 4 further comprising a position setting bolt for said bearing cover, said bolt passing through said baseplate inner wall in the area of one of said seat surface portions.

6. The device according to claim 1 further comprising vertically elongated channels provided in said cylinder block in the area around said connecting rods, said channels being adapted for receiving said sleeves which are displaceable upwards along said connecting rods after the disconnection of said pressure elements.

7. The device according to claim 1 wherein said engine is an internal combustion engine.